United States Patent [19]

Jones

[11] Patent Number: 5,116,094
[45] Date of Patent: May 26, 1992

[54] APPARATUS AND METHOD FOR HANDLING HONEYCOMB CORE

[75] Inventor: Darrell D. Jones, Lynnwood, Wash.

[73] Assignee: The Boeing Company, Seattle, Wash.

[21] Appl. No.: 499,923

[22] Filed: Mar. 23, 1990

Related U.S. Application Data

[63] Continuation-in-part of Ser. No. 324,276, Mar. 14, 1989, abandoned.

[51] Int. Cl.⁵ .............................................. B25J 15/04
[52] U.S. Cl. .................................. 294/81.61; 294/907; 414/741; 901/35; 901/39
[58] Field of Search ............. 294/61, 107, 81.6, 81.62, 294/81.61, 907; 414/741, 744.8, 751; 901/35, 39; 271/18.3; 221/213, 214

[56] References Cited

U.S. PATENT DOCUMENTS

| | | | |
|---|---|---|---|
| 2,617,548 | 11/1952 | Falkner | 294/87.1 X |
| 2,718,426 | 9/1955 | Nagy | 294/87.1 X |
| 4,260,187 | 4/1981 | Bejczy | 901/35 X |
| 4,588,348 | 5/1986 | Beni et al. | 901/34 X |

FOREIGN PATENT DOCUMENTS

| | | | |
|---|---|---|---|
| 0582090 | 11/1977 | U.S.S.R. | 901/34 |
| 0729545 | 4/1980 | U.S.S.R. | 901/34 |
| 0863333 | 9/1981 | U.S.S.R. | 294/61 |
| 2009096 | 6/1979 | United Kingdom | 294/61 |

*Primary Examiner*—Russell D. Stormer
*Attorney, Agent, or Firm*—Conrad O. Gardner; B. A. Donahue

[57] ABSTRACT

A plurality of gripper modules positioned in space apart relationship along a frame member provide an end-of-arm tool. A pair of gripper modules disposed on opposite sides of the end-of-arm tool each support a Hall effect sensor which is coupled through a signal processing circuit to control the heads of the gripper modules.

1 Claim, 5 Drawing Sheets

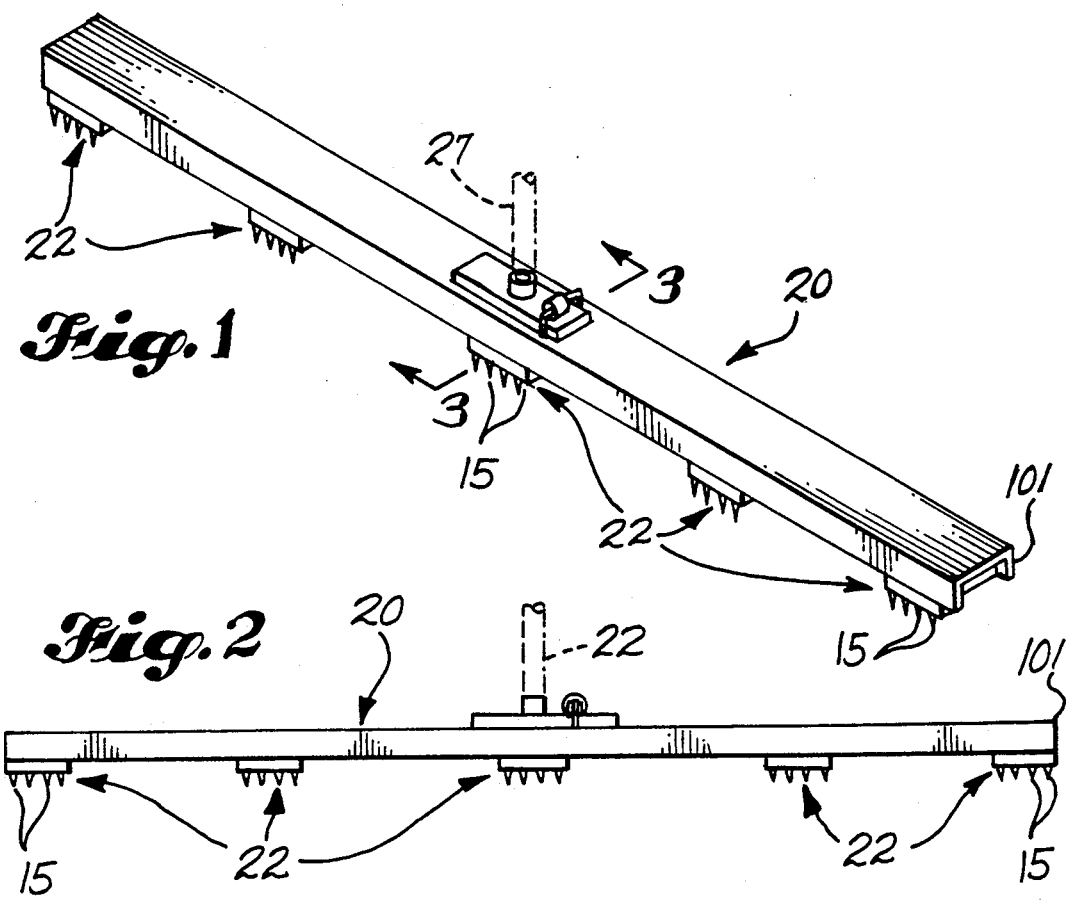
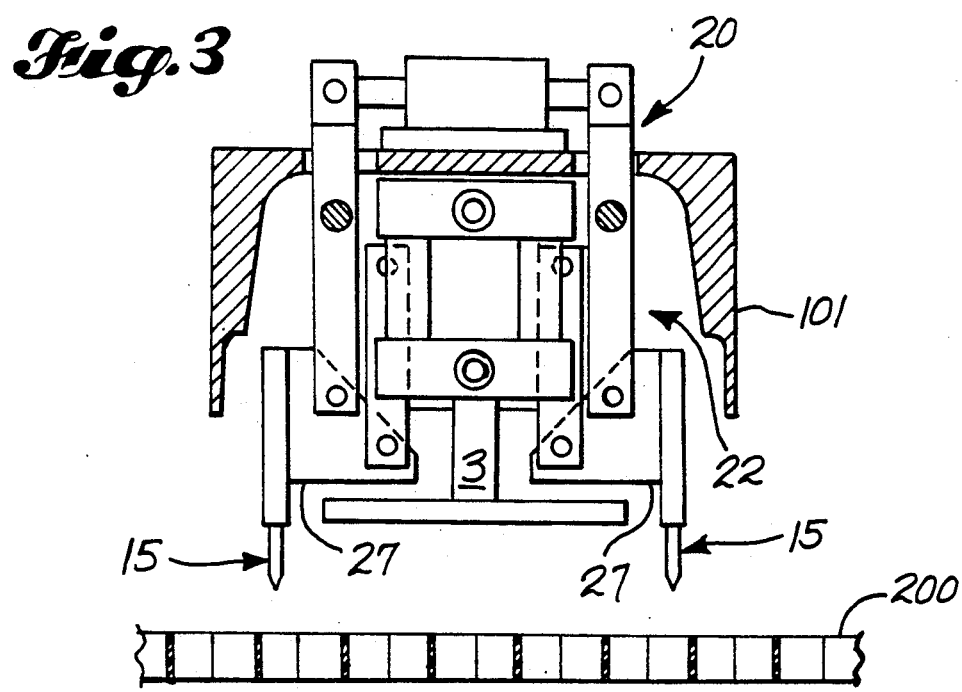

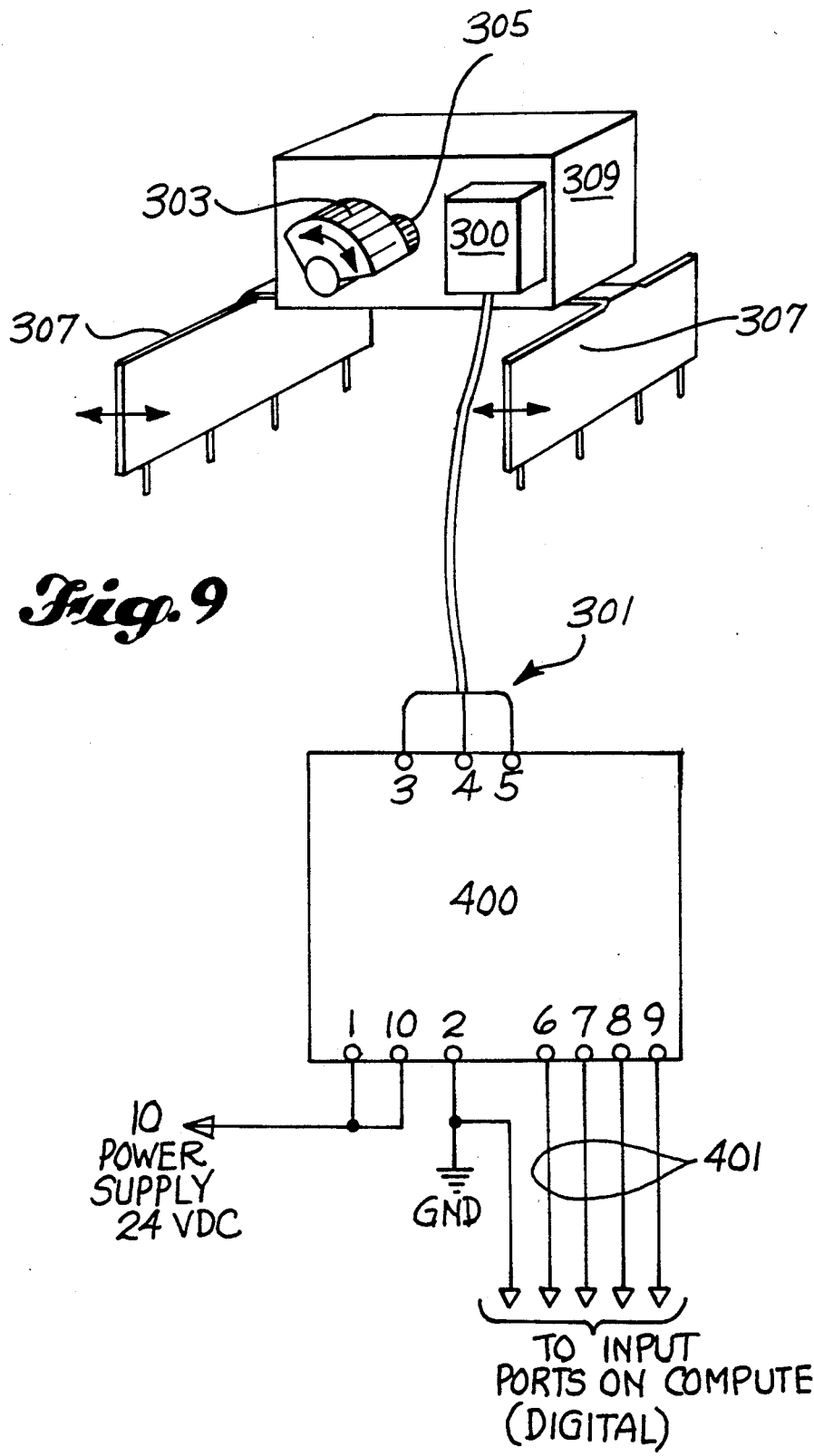

APPARATUS AND METHOD FOR HANDLING HONEYCOMB CORE

CROSS REFERENCE TO RELATED APPLICATIONS

This application is a continuation in part of application Ser. No. 07/324,276, filed Mar. 14, 1989 now abandoned.

FIELD OF THE INVENTION

This invention relates to a tool for handling honeycomb core and more particularly, to a plurality of gripper modules positioned in spaced apart relationship along a frame member with a pair of gripper modules having Hall effect sensors for controlling a pair of gripper heads within a gripper module.

BACKGROUND OF THE INVENTION

The invention relates to an apparatus and method for handling honeycomb core. The present EOA (end-of-arm) tool can be attached to a robot, to be used to pick up and then move pieces of honeycomb core.

Presently, a primary method of handling honeycomb core is by hand.

Exemplary prior art material includes U.S. Pat. No. 2,617,548 to Falkner, and U.S. Pat. No. 2,718,426 to Nagy, these systems relating to apparatus for lifting and moving concrete building blocks. These exemplary systems have fingers that insert into the cores of the blocks, expand, allowing lifting and moving and then contract, allowing removal. The exemplary systems utilize a separate finger for each block to be lifted, e.g. 20 blocks utilizing 20 fingers.

SUMMARY OF THE INVENTION

It is therefore an object of the present invention to provide a tool which is adapted for use as a robotic EOA (end-of-arm) tool which is air/electric operated with digital feedback for sensing when a section of honeycomb core is present. Gripping of the core is accomplished by insertion of small pins into the core cells, after which the pins are spread apart. After movement of the core to the desired predetermined location, the robotic end-of-arm tool is caused to eject the core by retraction of the pins and pushing off thereof by means of a small cylinder.

BRIEF DESCRIPTION OF THE DRAWINGS

The above and additional objects and advantages of the instant invention will be more clearly understood from the following detailed description thereof when read in conjunction with the accompanying drawings, in which:

FIG. 1 is a perspective view of robotic EOA (end-of-arm) tool 20;

FIG. 2 is a side view of the robotic end-of-arm tool 20 shown in FIG. 1;

FIG. 3 is a cross-sectional view taken along the lines 3—3 of the robotic end-of-arm tool 20 shown in FIG. 1 prior to insertion of pins into the core cells;

DESCRIPTION OF THE PREFERRED EMBODIMENT

Figure 4:
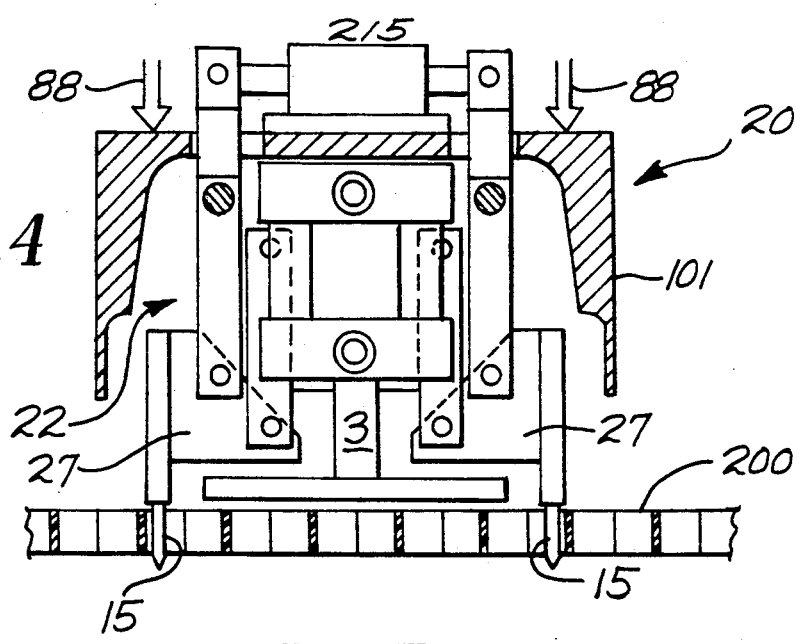
FIG. 4 is a cross-sectional view of FIG. 3, however showing the next step of insertion of pins into the core cells.
Figure 5:
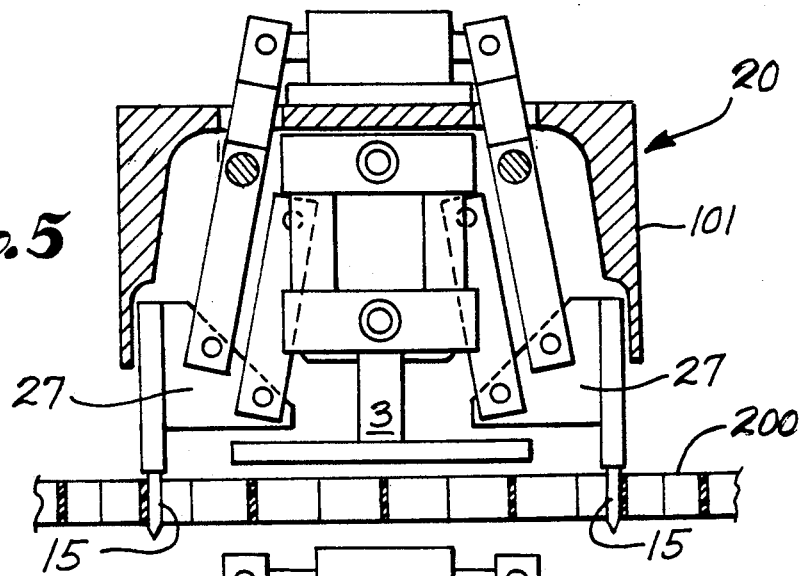
FIG. 5 is a cross-sectional view of FIGS. 3 and 4, however showing the further step of spreading the pins apart to permit subsequent movement of the core section to a desired predetermined location.

Referring now to the drawings, and more particularly to FIG. 1, end-of-arm tool 20 is shown to comprise an elongated frame member 101 of generally U-shaped cross section which is centrally attached to arm 23 (shown in dotted line representation) and which end-of-arm tool 20 is moved about under robot control (not shown) of arm 23. End-of-arm tool 20 has a plurality of spaced apart gripper modules 22 inserted in the mouth of and distributed along frame member 101. Pins 15 actually accomplish the picking up and transporting of honeycomb core section 200 as will be described hereinafter and as seen in more detail in FIGS. 3-6. Side view of end-of-arm tool 20 shown in FIG. 2 shows pins 15 extending downward below spaced apart gripper modules 22. Each spaced apart gripper module 22 has eight pins 15 located in two rows of four pins each of said rows disposed on each side of the gripper module on said gripper head jaws and the pins 15 enter honeycomb core section 200 at random, being guided by tapered points on the ends of pins 15 and the inherent flexibility of honeycomb core section 200. The sideways movement of pins 15 is restricted to not damage honeycomb core section 200, but allows enough force (when pins 15 are in tension against the inner walls of the cells of honeycomb core section 200) to lift the core.

In the operation of the present end-of-arm tool 20, elongated frame member 101 is moved over honeycomb core section 200 as seen in FIG. 3. Gripper head jaws 27 which control the movement of pins 15 are pulled together in the retracted position as shown in FIG. 3, and cylinder 3 is also withdrawn above the ends of pins 15 in the retracted position as shown in FIG. 3.

Turning now to FIG. 4, it can be seen in the next step that elongated frame member 101 is lowered down (in the direction of arrows 88) from the previous position (shown in FIG. 3) so that pins 15 have entered through the cells of honeycomb core section 200. In the next step shown in FIG. 5, gripper head jaws 27 are then moved apart causing honeycomb core section to be placed under tension via the walls of the cells of honeycomb core section 200. Honeycomb core section 200 is in the gripped position in FIG. 5 and can be moved around to a predetermined location. In the gripped position, or in any other position, Hall sensor 203 as shown in FIGS. 3, 4, 5 and 6 which senses the distance between gripper head jaws 27 feeds such information to signal processor 201 (as seen in the mechanical flow diagram of FIG. 7) to enable robot control of end-of-arm tool 20 in the manner shown in the robot program flow diagram of FIG. 8. Signal process circuit 201 shown in the mechanical flow diagram of FIG. 7 may comprise e.g. Set Point Module type 9800-01-0200 termed a source type Hall sensor with Set Point Module as manufactured by PHS Inc. of Fort Wayne, IN. At least a pair of systems shown in block diagram representation in FIG. 7 are utilized, one for a gripper module 22 on opposite sides of end-of-arm tool 20.

After end-of-arm tool 20 has been moved to a desired location for unloading honeycomb core section 200, elongated frame member 101 is lowered to a height that is equal to or greater than the thickness of honeycomb core section 200.

Figure 6:
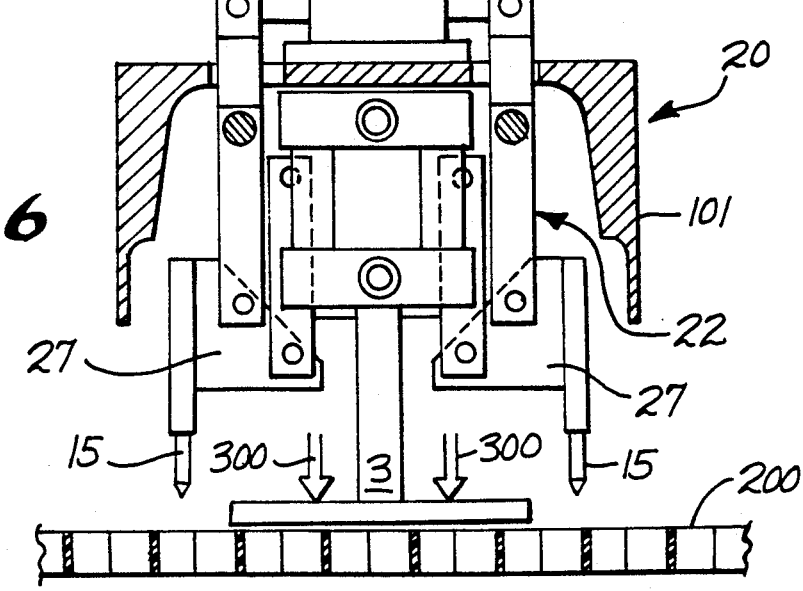
FIG. 6 is a cross-sectional view of FIGS. 3, 4, and 5 showing the last step of ejecting the core section from the end-of-arm tool by retraction of the pins and pushing the core section off thereof by downward force provided by a cylinder.
Figure 7:
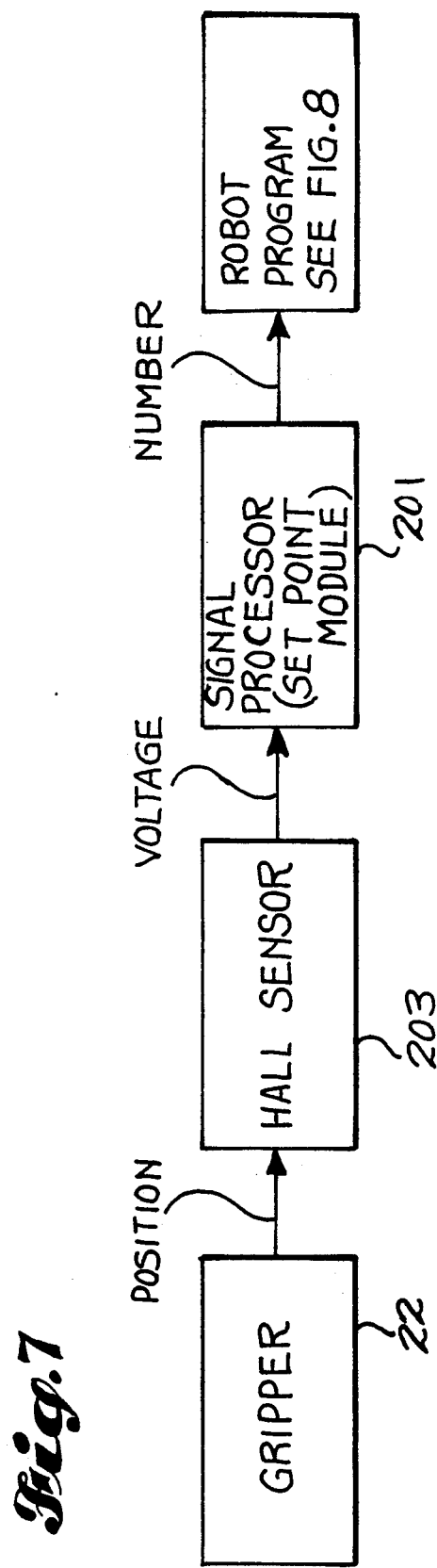
FIG. 7 is a mechanical flow diagram showing gripper control through utilization of Hall device sensing and signal processing.
Figure 8:
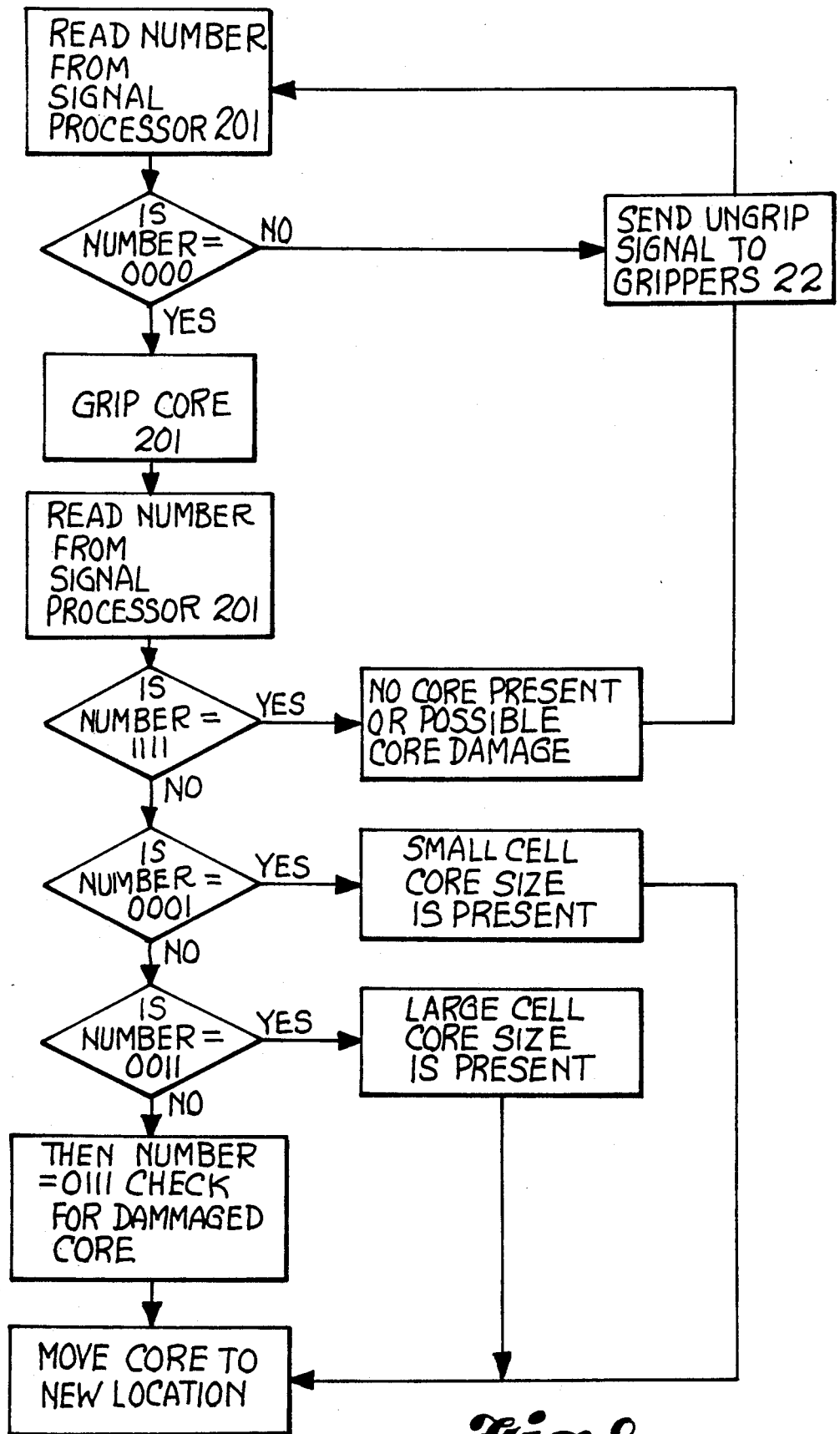
FIG. 8 is a flow diagram showing development of gripper control signals for moving honeycomb core sections; and, FIG. 9 is a schematic diagram showing Hall sensor signal processing in accordance with a preferred embodiment of the invention.

To release honeycomb core section 200 from pins 15 as shown in FIG. 6, gripper head jaws 27 are moved back together to the starting position (as seen in FIG. 3) in accordance with the flow control diagram of FIG. 8 while cylinder 3 is simultaneously pushing (as seen in the direction of arrows 300) honeycomb core section 200 off the ends of pins 15. End-of-arm tool 20 has resumed the position shown in FIG. 3 and is available for transporting the next honeycomb core section.

DETERMINATION OF CORE SHEET

Core cell size can be determined by the difference in stretch of material when subjected to a given gripping force, for example:

⅛ inch core cell material will stretch only ¼ inch when picked up with a gripping force of 4 lbs, whereas 3/16 inch core cell material will stretch ⅜ inch.

If then, gripper jaws move apart by ¼ inch, the Hall sensor will send a voltage ($\pm 5$ volts) to the processing circuit according to the distance of the magnet from the Hall sensor.

But, when the gripper jaws move ⅜ inch apart, the Hall sensor generates an output of about 11 volts.

Therefore, any time there is a reading of $\pm 5$ volts, it can be assumed that the operator has ⅛ inch core cell material. Likewise, if $\pm 11$ volts is measured, the operator has 3/16 inch core cell material.

Turning now to FIG. 9 and system signal processing for the present apparatus and method for handling honeycomb core, it can be seen that Hall sensor 300 provides an analog voltage output 301 which is a function of the distance of magnet 303 from Hall sensor 300. As magnet 303 rotates with shaft 305, magnet 303 is moved either further away from or closer to Hall sensor 300. Shaft 305 rotates in proportion to movement of gripper jaws 307 of gripper module 309. Signal processing circuit 400 simply converts analog voltage output 301 from Hall sensor 300 to a 4-bit digital output 401.

What is claimed is:

1. An end-of-arm tool for transporting honeycomb core sections comprising in combination:

a frame member;

a plurality of spaced apart gripper modules distributed along said frame member;

each of said plurality of spaced apart gripper modules having a pair of gripper head jaws;

each of said pair of gripper head jaws having a plurality of pins;

a pair of Hall sensors disposed on a pair of said plurality of spaced apart gripper modules for sensing the distance between said pair of gripper jaws;

signal processing circuit means coupled to each of said pair of Hall sensors for sensing the movement of said gripper head jaws; and, means including a cylinder for ejecting a core section from said end-of-arm tool by retraction of said plurality of pins while simultaneously pushing said core section off of said plurality of pins.

* * * * *